United States Patent
Jangam et al.

(10) Patent No.: US 12,138,685 B2
(45) Date of Patent: Nov. 12, 2024

(54) CONTROLLING GREEN BODY OBJECT DEFORMATION

(71) Applicant: Hewlett-Packard Development Company, L.P., Spring, TX (US)

(72) Inventors: John Samuel Dilip Jangam, Palo Alto, CA (US); Thomas Anthony, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 216 days.

(21) Appl. No.: 17/052,597

(22) PCT Filed: Mar. 18, 2019

(86) PCT No.: PCT/US2019/022710
§ 371 (c)(1),
(2) Date: Nov. 3, 2020

(87) PCT Pub. No.: WO2020/190274
PCT Pub. Date: Sep. 24, 2020

(65) Prior Publication Data
US 2021/0402467 A1    Dec. 30, 2021

(51) Int. Cl.
*B22F 1/00* (2022.01)
*B22F 1/10* (2022.01)
(Continued)

(52) U.S. Cl.
CPC ............... *B22F 10/14* (2021.01); *B22F 1/09* (2022.01); *B22F 1/10* (2022.01); *B22F 1/103* (2022.01);
(Continued)

(58) Field of Classification Search
CPC .... B22F 1/09; B22F 1/10; B22F 1/103; B22F 1/107; B22F 10/14; B22F 2304/10;
(Continued)

(56) References Cited

U.S. PATENT DOCUMENTS 5,419,860 A    5/1995  Menchhofer
6,849,230 B1   2/2005  Feichtinger
(Continued)

FOREIGN PATENT DOCUMENTS

CN    1382540 A       12/2002
CN    101010161 A     8/2007
(Continued)

OTHER PUBLICATIONS

Caputo, Matthew, "4-Dimensional Printing and Characterization of Net-Shaped Porous Parts Made from Magnetic Ni—Mn—Ga Shape Memory Alloy Powders", Youngstown State Univ, May 2018.
(Continued)

*Primary Examiner* — Jenny R Wu
(74) *Attorney, Agent, or Firm* — Dierker & Kavanaugh, P.C.

(57) ABSTRACT

A shaping composition for controlling deformation of a green body object during heat fusing can include a liquid vehicle present at from 10 wt % to about 80 wt %, based on a total weight of the shape retaining composition, and a metal particulate mixture present at from about 20 wt % to about 90 wt % based on a total weight of the shaping composition. The metal particulate mixture can include aluminum-containing particulates and secondary metal-containing particulates. The metal particulate mixture can have an aluminum elemental content to secondary metal elemental content atomic ratio of about 10:1 to about 1:2.

10 Claims, 5 Drawing Sheets

(51) Int. Cl.
  *B22F 1/103* (2022.01)
  *B22F 1/107* (2022.01)
  *B22F 10/14* (2021.01)
  *B33Y 10/00* (2015.01)
  *B33Y 50/02* (2015.01)
  *B33Y 70/10* (2020.01)

(52) U.S. Cl.
  CPC .............. *B22F 1/107* (2022.01); *B33Y 10/00* (2014.12); *B33Y 50/02* (2014.12); *B33Y 70/10* (2020.01); *B22F 2304/10* (2013.01)

(58) Field of Classification Search
  CPC ......... B33Y 10/00; B33Y 50/02; B33Y 70/00; B33Y 70/10; C22C 1/0416; Y02P 10/25
  See application file for complete search history.

(56) References Cited

U.S. PATENT DOCUMENTS

| | | | |
|---|---|---|---|
| 8,961,840 B1 | 2/2015 | Hill et al. | |
| 9,399,256 B2 | 7/2016 | Buller et al. | |
| 9,427,941 B2 | 8/2016 | Feinstein | |
| 9,833,839 B2 | 12/2017 | Gibson et al. | |
| 10,040,216 B2 | 8/2018 | Bai et al. | |
| 10,087,332 B2 | 10/2018 | Connor et al. | |
| 2001/0050031 A1 | 12/2001 | Bredt et al. | |
| 2002/0189405 A1 | 12/2002 | Liu et al. | |
| 2009/0018009 A1 | 1/2009 | Zambaldo | |
| 2009/0126833 A1 | 5/2009 | Cavanaugh et al. | |
| 2009/0233118 A1* | 9/2009 | Katoh | B23K 35/286 228/256 |
| 2010/0183471 A1 | 7/2010 | Liu et al. | |
| 2012/0009340 A1 | 1/2012 | Sepeur et al. | |
| 2013/0004664 A1 | 1/2013 | Agrawal et al. | |
| 2014/0087210 A1 | 3/2014 | Keane et al. | |
| 2014/0342083 A1 | 11/2014 | Wu et al. | |
| 2015/0158244 A1 | 6/2015 | Tibbits et al. | |
| 2015/0176115 A1 | 6/2015 | Lin et al. | |
| 2016/0271877 A1 | 9/2016 | Suzuki et al. | |
| 2016/0288206 A1 | 10/2016 | Ohtaki et al. | |
| 2016/0339517 A1 | 11/2016 | Joshi et al. | |
| 2017/0029929 A1 | 2/2017 | Konyashin et al. | |
| 2017/0159459 A1 | 6/2017 | Courcot et al. | |
| 2017/0175834 A1 | 6/2017 | Bracamonte et al. | |
| 2018/0117845 A1 | 5/2018 | Bullet et al. | |
| 2018/0193913 A1 | 7/2018 | Iwai et al. | |
| 2018/0194992 A1 | 7/2018 | Aou et al. | |
| 2018/0207749 A1 | 7/2018 | Wasynczuk | |
| 2018/0298215 A1* | 10/2018 | Andersen | B29C 64/165 |
| 2018/0304363 A1 | 10/2018 | Myerberg et al. | |
| 2018/0305266 A1* | 10/2018 | Gibson | B33Y 40/20 |
| 2018/0305863 A1 | 10/2018 | Dimotakis et al. | |
| 2018/0326480 A1 | 11/2018 | Opschoor et al. | |
| 2018/0369909 A1 | 12/2018 | Ibe et al. | |
| 2019/0003019 A1 | 1/2019 | Ibe et al. | |
| 2019/0016904 A1 | 1/2019 | Connor et al. | |
| 2019/0047045 A1 | 2/2019 | Shaarawi et al. | |
| 2019/0161837 A1 | 5/2019 | Maderud et al. | |
| 2019/0308241 A1 | 10/2019 | Lundin et al. | |
| 2020/0254519 A1 | 8/2020 | Jones et al. | |
| 2020/0406351 A1* | 12/2020 | Kasperchik | B33Y 70/10 |
| 2021/0086266 A1 | 3/2021 | Black et al. | |
| 2021/0163364 A1 | 6/2021 | Hou et al. | |
| 2021/0283686 A1* | 9/2021 | Olubummo | B22F 10/14 |

FOREIGN PATENT DOCUMENTS

| | | |
|---|---|---|
| CN | 101068503 A | 11/2007 |
| CN | 101365558 A | 2/2009 |
| CN | 101384519 A | 3/2009 |
| CN | 101435066 A | 5/2009 |
| CN | 101489704 A | 7/2009 |
| CN | 101594954 A | 12/2009 |
| CN | 102395707 A | 3/2012 |
| CN | 102579142 A | 7/2012 |
| CN | 102649330 A | 8/2012 |
| CN | 103608314 A | 2/2014 |
| CN | 103702811 A | 4/2014 |
| CN | 103718254 A | 4/2014 |
| CN | 203619302 U | 6/2014 |
| CN | 104116578 A | 10/2014 |
| CN | 104625071 A | 5/2015 |
| CN | 104722752 A | 6/2015 |
| CN | 104888616 A | 9/2015 |
| CN | 104894554 A | 9/2015 |
| CN | 105142825 A | 12/2015 |
| CN | 105268977 A | 1/2016 |
| CN | 105364065 A | 3/2016 |
| CN | 105399966 A | 3/2016 |
| CN | 105451916 A | 3/2016 |
| CN | 105642885 A | 6/2016 |
| CN | 105665706 A | 6/2016 |
| CN | 106738875 A | 5/2017 |
| CN | 107001162 A | 8/2017 |
| CN | 107073825 A | 8/2017 |
| CN | 107075687 A | 8/2017 |
| CN | 107848029 A | 3/2018 |
| CN | 107921533 A | 4/2018 |
| CN | 107922828 A | 4/2018 |
| CN | 108188396 A | 6/2018 |
| CN | 108430765 A | 8/2018 |
| CN | 108503355 A | 9/2018 |
| CN | 108602118 A | 9/2018 |
| CN | 108602264 A | 9/2018 |
| CN | 109153036 A | 1/2019 |
| CN | 109261958 A | 1/2019 |
| CN | 109311091 A | 2/2019 |
| CN | 109451732 A | 3/2019 |
| CN | 109730803 A | 5/2019 |
| CN | 110177636 A | 8/2019 |
| EP | 1224989 A2 | 7/2002 |
| KR | 10-1749212 B1 | 6/2017 |
| KR | 10-1885474 B1 | 8/2018 |
| TW | 461839 B | 11/2001 |
| TW | 201327581 A | 7/2013 |
| TW | 201427924 A | 7/2014 |
| TW | M483189 U | 8/2014 |
| TW | 201829154 A | 8/2018 |
| WO | 2006/079459 A1 | 8/2006 |
| WO | 2012/156905 A1 | 11/2012 |
| WO | 2013/020946 A1 | 2/2013 |
| WO | 2016/140888 A1 | 9/2016 |
| WO | 2016/187624 A2 | 11/2016 |
| WO | 2017/181054 A1 | 10/2017 |
| WO | 2017/183893 A2 | 10/2017 |
| WO | 2018/017369 A2 | 1/2018 |
| WO | 2018/156933 A1 | 8/2018 |
| WO | WO-2018200515 | 11/2018 |
| WO | 2019/025801 A1 | 2/2019 |
| WO | 2019/027420 A1 | 2/2019 |
| WO | WO-2019156675 A1 * | 8/2019 ............ B22F 1/0018 |
| WO | WO-2019177614 A1 * | 9/2019 ............ B22F 1/0011 |

OTHER PUBLICATIONS

Liu, Guo et al., "Origami and 4D printing of elastomer-derived ceramic structures," Science Advances, Aug. 17, 2018, 1-10.
Bai, Y., et al. "Binder jetting additive manufacturing with a particle-free metal ink as a binder precursor," Materials & Design, vol. 147, Mar. 10, 2018, pp. 146-156.
Liu, Chang-Hua, et al. "Microstructure and permeability of Ni/Al2O3 cermet coating for SOFC supporter," vol. 33, No. 12, Dec. 2009, pp. 1075-1085.
Possart, W. "Curing of Polymer Adhesives on Metals: Adhesion-Interphase-Properties," Proceedings of 2010 Beijing International Bonding Technology Symposium, Nov. 30, 2010, pp. 1-30.

\* cited by examiner

CONTROLLING GREEN BODY OBJECT DEFORMATION

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
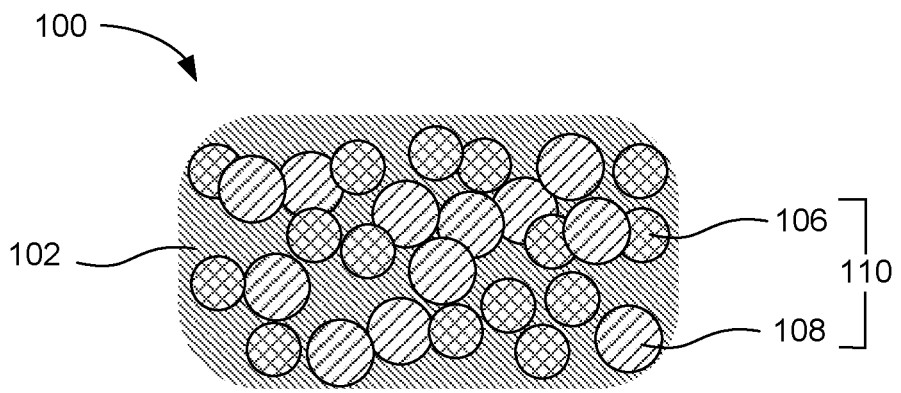
FIG. 1 illustrates an example shaping composition in accordance with the present disclosure.

Three-dimensional (3D) printing can be an additive process that can involve the application of successive layers of particulate build material with build binders or adhesives printed thereon to bind the successive layers of the particulate build materials together. In some processes, application of build binder can be utilized to form a green body object and then a fused three-dimensional physical object can be formed therefrom. More specifically, binding agent can be selectively applied to a layer of a particulate build material on a support bed to pattern a selected region of the layer and then another layer of the particulate build material is applied thereon. The binding agent can be applied to another layer of the particulate build material and these processes can be repeated to form a green part or green body object. The green body object can be sintered or otherwise heat-fused to form a fused metal object. However, during the heat-fusing process, with many green body objects prepared or printed with metal build particles and a build binder, often the build binder may not be fully available while ramping the temperature of the fusing oven up to sintering or other fusing temperatures, as the build binder may burn off, e.g., polymer binder, temperatures before fusing begins, or for other reasons that the build binder may not be effective prior to fusing of the green body object to form a fused metal object. This gap between the temperature range effectiveness of build binder in a green body object and the temperature at which the object becomes fused can lead to sagging, particularly with cantilevered portions of a part and/or portions of a part that span or bridge multiple structures. This sagging can be alleviated using support structures placed at locations where there may be an expectation of sagging. However, in accordance with examples of the present disclosure, coating compositions can be applied to green body objects at strategic locations, coating thickness, and/or compositional makeup to provide for sag resistance, even when support structures may not be present.

In accordance with examples of the present disclosure, a shaping composition for controlling green body object deformation can include a liquid vehicle present at from 10 wt % to 80 wt % based on a total weight of the shape retaining composition, and a metal particulate mixture present at from about 20 wt % to about 90 wt % based on a total weight of the shaping composition. The metal particulate mixture can include aluminum-containing particulates and secondary metal-containing particulates. The metal particulate mixture can have an aluminum elemental content to secondary metal elemental content atomic ratio of about 10:1 to about 1:2. In one example, the shaping composition can further include a shaping binder, such as a polymeric shaping binder or a polymerizable shaping binder. The shaping binder can likewise be a reducible-metal compound shaping binder, e.g., inorganic salts, organic salts, or oxides of copper, iron, aluminum, chromium, titanium, cobalt, silver, gold, nickel, tin, or zinc, e.g., copper nitrate shaping binder. The shaping composition can be formulated to be a viscous slurry having a viscosity from about 50 cps to about 5000 cps. In further detail, the aluminum-containing particulates can be, for example, aluminum-silicon or aluminum-silicon-magnesium alloy particulates having a D50 particle size from about 1 μm to about 100 μm. The secondary metal-containing particulates can be, for example, iron-containing particulates having a D50 particle size from about 1 μm to about 100 μm. The iron-containing particulates can be stainless steel particulates or elemental iron particulates in some examples.

In another example, a three-dimensional printing kit can include a particulate build material comprising about 80 wt % to 100 wt % metal build particles having a D50 particle size distribution value from about 1 μm to about 150 μm, and a binding agent including a build binder to apply to particulate build material layers to form a green body object. The printing kit can further include a shaping composition for controlling green body object deformation. The shaping composition can include a metal particulate mixture. The shaping composition can be applied to a surface of the green body object to control, e.g., ameliorate, deformation within an intermediate temperature ($T_{int}$) range where the build binder may not be effective at retaining the green body object shape prior to the metal build particles becoming heat-fused. In one example, the shaping composition can include a metal particulate mixture including a metal particulate mixture including aluminum-containing particulates and secondary metal-containing particulates. The metal particulate mixture can have an aluminum elemental content to secondary metal elemental content atomic ratio of about 10:1 to about 1:2. In another example, the metal build particles can be copper-containing metal particles including from 50 wt % to 100 wt % elemental copper. The shaping composition can include from about 10 wt % to about 80 wt % liquid vehicle and from 20 wt % 90 wt % the metal particulate mixture based on total weight of the shaping composition. In another example, the shaping composition further can include a reducible-metal compound shaping binder.

In another example, a method of controlling green body object deformation can include applying a coating of shaping composition to a surface of a green body object at a surface location to counteract temperature induced deformation of the green body object. The green body object can include metal build particles bound together with build binder. The shaping composition can include a metal particulate mixture including multiple types of metal particulates. The method can further include ramping-up temperature applied to the green body object though an intermediate temperature range where (i) multiple types of metal particulates of the shaping composition interact with one another, (ii) metal particulates of the shaping composition interact with metal build particles of the green body object, or (iii) both. The shaping composition can counteract temperature induced deformation of the green body object while the green body object is within the intermediate temperature range. The method can also include fusing the green body object at a fusing temperature to form a fused metal object. In one example, forming the green body object can be by three-dimensional printing, including iteratively applying individual build material layers of a particulate build material including the metal build particles, and based on the 3D object model, selectively applying a binding agent to individual build material layers to define individually patterned layers that are built up and bound together to form the green body object.

It is noted that when discussing the shaping compositions, the three-dimensional printing kits, and/or the methods herein, these discussions can be considered applicable to one another whether or not they are explicitly discussed in the context of that example. Thus, for example, when discussing aluminum-containing particulates of the metal shaping mixture, such disclosure is also relevant to and directly supported in the context of the three-dimensional printing kits and methods, and vice versa.

It is also understood that terms used herein will take on their ordinary meaning in the relevant technical field unless specified otherwise. In some instances, there are terms defined more specifically throughout the specification or included at the end of the present specification, and thus, these terms can have a meaning as described herein.

Shaping Compositions

In accordance with examples of the present disclosure, a shaping composition 100 for three-dimensional metal object formation is shown by way of example in FIG. 1. The shaping composition can include a liquid vehicle 102 and a metal shaping mixture 110. The metal shaping mixture can include aluminum-containing particulates 106 as well as secondary metal-containing particulates 108. In some examples, the shaping composition can include a shaping binder (not shown), such as a reducible-metal compound shaping binder or a polymeric or polymerizable shaping binder. The term "shaping binder" is used to distinguish the binder used in the shaping composition from the binder that may be used in the fusing agent during a three-dimensional object build. The latter binder mentioned can be referred to as a "build binder." As the shaping binder and the build binder can be selected from a common list of compounds, e.g., polymer, reducible-metal compounds, etc., sometimes the simple term "binder" is used herein, but it is understood to be one or the other type of binder based on context. If the context allows for it to mean both types of binder, than the term can be applicable to both types of binder. As mentioned, in accordance with examples of the present disclosure, coating compositions of the shaping compositions described herein can be applied to green body objects formed of metal particles on surfaces thereof at strategic locations and coating thickness, considering compositional makeup fusing temperature profiles, e.g., heat ramp-up timing to sintering temperatures, to counteract unwanted part sagging or other unwanted deformation. Thus, it can be said that undesirable deformations that can occur due to the heat-fusing process, e.g., due to gravity, can be counteracted by positive shaping composition-induced surface support provided by appropriate application of the shaping compositions described herein.

The aluminum-containing particulates 106 and the secondary metal-containing particulates 108 can be thermally stable in the shaping composition to a temperature from about 250° C. to about 500° C., up to about 600° C., up to about 700° C., for example, but can also be interactive at a temperature from about 500° C. to about 1000° C., from about 600° C. to about 1000° C., or from about 700° C. to about 1000° C. The term "interactive" when referring to the metals or metal alloys described herein refers to various chemical or physical reactions that can occur between multiple metals or alloys when exposed to heat, such as at shaping temperatures, $T_{shape}$, described herein. For example, multiple metals of a shaping composition, or more specifically a metal shaping mixture of the shaping composition, can be exothermic reactive with one another when exposed to heat. Alternatively, one metal or multiple metals of the shaping composition can be interactive with metal build particles of the green body object, e.g., aluminum and/or other metals can alloy at a surface of the green body object with metal build particles thereof. Whether exothermically reactive, physically reactive, or some other interaction occurs between metals or alloys of different particles at a surface of the green body object, the heat (of the furnace and/or exothermic heat of the reaction, etc.) at the surface of the green body object during ramp-up to fusing temperature, $T_{fuse}$, can provide stability to the green body object. If aluminum is used as one of the metal shaping mixture metals, In one example, the aluminum content and secondary metal content in the metal shaping mixture 110 can be present at an atomic ratio of from about 10:1 to about 1:2 (aluminum to secondary metal ratio), or from about 5:1 to about 1:2, or from about 2:1 to about 1:2, for example. The aluminum-containing particulates and/or the secondary metal-containing particulates can independently be included in the shaping metal shaping mixture at a D50 particle size from about 1 μm to about 100 μm, from about 2 μm to about 75 μm, or from about 5 μm to about 50 μm, for example. Aluminum is given herein by way of example as a "first metal" to be used with the secondary metal, but other combinations of metals can be used that may promote stability to 3D-printed or 3D-formed objects during ramp-up to fusing temperatures, $T_{fuse}$.

To provide some examples, the aluminum-containing particulates can be elemental aluminum particulates, or can be aluminum alloy, such as aluminum silicon alloy, aluminum manganese alloy, aluminum silicon magnesium alloy, aluminum zinc alloy, aluminum zinc magnesium, and/or aluminum copper alloy particulates, for example. The secondary metal-containing particulates can be an elemental metal or metal alloy that is interactive, e.g., exothermically reactive or otherwise may assist with aluminum alloying with metal build particles of the green body object at a surface thereof for example. Example metals that can be used as the secondary metal can include iron, copper, nickel, titanium, zinc, and/or tin, for example. Example alloys that can be used include steel, stainless steel, cast iron, alloys of iron an nickel, alloys of iron and chrome, alloys of copper such as bronze, brass, and other copper alloys, e.g., copper alloys with 50 wt % up to less than 100 wt % copper content, or the like. In one specific example, the metal shaping mixture can be formulated so that there is an aluminum and iron elemental content having an atomic ratio from about 10:1 to about 1:2, from about 5:1 to about 1:2, from about 2:1 to about 1:2, from about 4:5 to about 5:4, from about 4:3 to about 3:4, or from about 3:2 to about 2:3, for example. The aluminum and iron can be provided by elemental metals and/or alloys, but the aluminum and iron content can be within this range, for example.

In further detail, the shaping composition 100 can be in the form of a coating composition in one example, or can be in the form of a slurry in another example. The shaping composition can be self-supporting and/or self-adhesive to a green body object, and in some instances, self-adhesive to a green body object when oriented in any direction, counteracting or holding to green body object surfaces with gravitational pull working against the shaping composition location relative to a surface of the green body object. In one example, the shaping composition can have a viscosity from about 500 to about 800 cps, from about 800 cps to about 2000 cps, or from about 2000 cps to about 5000 cps. These more viscous shaping compositions can be applied by a mechanical applicator, such as a roller, a hard tool such as a spackle applicator or a blade, a blade coater, a Meyer rod coater, etc. With less viscous compositions, sprayers, jetting architecture, dip coaters, curtain coaters, or brushes, or the like can be used to apply the shaping compositions. Example viscosities for these types of shaping compositions can be from about 50 cps to about 250 cps, from about 50 cps to about 100 cps, or from about 100 cps to about 500 cps, for example. Viscosities outside these ranges can be used as well. Example coating thickness for the shaping compositions can be from about ½ mm to about 10 mm, from about 1 mm to about 8 mm, or from about 2 mm to about 5 mm.

As mentioned, in addition to the liquid vehicle 102, the shaping composition 100 can also include a shaping binder (not shown). For example, a blend of the metal shaping mixture and the shaping binder can be added to a liquid vehicle, or the liquid vehicle can be included with the metal shaping mixture/shaping binder blend as a fluid composition, e.g., paste, slurry, etc. The liquid vehicle and the shaping binder can be similar to that which is used in fluids that are applied to particulate build material for printing three-dimensional green objects, which is described in greater detail hereinafter. Thus, the description of liquid vehicle and build binder as it relates to printing three-dimensional objects presented hereinafter is relevant to the shaping compositions, and that description is incorporated herein by reference. In short, however, liquid vehicle and build binder can be used to form a binding agent. The liquid vehicle can be water or an aqueous liquid vehicle with other components, e.g., organic co-solvent, surfactant, biocide or fungicide, etc. The liquid vehicle can likewise be organic or non-aqueous, including from no water to deminimis concentrations of water, e.g., up to 5 wt %. The build binder can be a polymeric binder such as a latex binder, a polyurethane binder, or can be a reducible-metal compound binder, such as copper nitrate or other metal compound as described in greater detail hereinafter. The shaping binder can likewise be any of these types of binders, and can be present in the shaping composition at from about 2 wt % to about 30 wt %, from about 3 wt % to about 25 wt %, from about 3 wt % to about 20 wt %, from about 4 wt % to about 15 wt %, from about 2 wt % to about 10 wt %, or from about 2 wt % to about 8 wt %, for example. In further detail, the liquid vehicle can be present in the shaping composition at from about 10 wt % to about 80 wt %, from about 15 wt % to about 60 wt %, from about 20 wt % to about 50 wt %, or from about 25 wt % to about 50 wt %.

In further detail, aluminum works well for one of the two metals of the metal shaping mixture because it can interact, e.g., exothermic reaction or other metal-metal interaction, with multiple secondary metals, and in some instances, it can diffuse or be infused with the metal build particles used to form the green body object. Using copper metal build particles as an example, aluminum can melt at a relatively low temperature, and a portion of the aluminum can diffuse into copper particles and another portion can remain to interact with the secondary metal-containing particulates, such as an iron-based metal or alloy, e.g., stainless steel. In some examples, the metal shaping mixture that is present in the shaping composition can be from 10 wt % to 60 wt % aluminum, from 20 wt % to 50 wt % aluminum, or from 25 wt % to 45 wt % aluminum, based on total elemental aluminum content compared to the weight of the metal shaping mixture. These weight percentages would be reduced if based on the total weight of the shaping composition, which can include liquid vehicle, shaping binder, and/or other components used to form the slurry and act to bind the shaping composition together. The secondary metal can likewise be present in the metal shaping mixture at from 10 wt % to 60 wt %, from 20 wt % to 50 wt %, or from 25 wt % to 45 wt %, based on the secondary metal content compared to the weight of the metal shaping mixture. In some examples, it has been found that forming an alloy between the aluminum and the metal build particles can occur prior to curvature being introduced into the green body part, which can occur initially during an intermediate temperature range, which is usually prior to fusing temperatures, for example. For example, forming an alloy between aluminum (from the metal shaping mixture) and copper (from the green body object) at just the surface or slightly there beneath can lead to deformation of the green body object, e.g., inducing shapes beyond that which counteracts sagging or gravitationally-induced deformations.

Thus, with these properties and in accordance with the present disclosure, when the shaping composition has the correct formulation, thickness, and/or the like, and/or is applied at an appropriate location, the metal particulate mixture in the shaping composition, applied as a coating to a surface of the green body object, can provide an interaction, e.g., exothermic or other otherwise reactive or alloying interaction, with surface to provide chemical, alloying, and/or exothermic reactive to the surface to counterbalance gravitational forces that lead to sagging, e.g., that may occur during heat-fusing while ramping the temperature up through intermediate temperatures. This chemical, physical, and/or exothermic reaction that occurs at a surface of the green body object can be referred to as "shaping composition-induced surface support," as it is applied to the surface and supports the original structure during heat fusing. That stated, in one specific example, it is noted that the shaping composition can be used to control green body object deformation by introducing new shapes to the green body object, e.g. 4D printing. This can be done by varying the compositional makeup of the shaping composition, including thicker coatings, and/or by placing the shaping composition at locations not intended to reduce deformation, etc., to introduce a new formation or shape beyond the green body object configuration as printed or otherwise formed. Thus, the shaping compositions can be used to "control" the green body object by introducing new shapes to the green body object beyond that which could be used for shape retention while at intermediate and fusing temperatures.

Three-Dimensional Printing Kits and Systems

Figure 2:
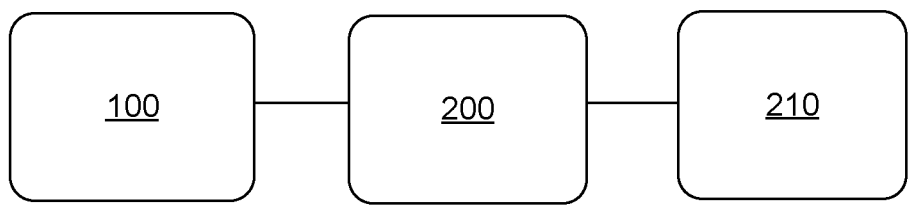
FIG. 2 illustrates an example three-dimensional printing kit in accordance with the present disclosure.

In accordance with examples of the present disclosure, a three-dimensional printing kit 200 is shown in FIG. 2. The three-dimensional printing kit can include a particulate build material 200 including about 80 wt % to 100 wt % metal build particles having a D50 particle size distribution value from about 1 μm to about 150 μm, a binding agent 210 to apply to particulate build material layers to form a green body object, and a shaping composition 100. The shaping composition can be as described with respect to FIG. 1 and elsewhere herein. For example, the shaping composition can include a metal shaping mixture to apply to a surface of the green body object to introduce a shaping composition-induced surface support to the green body object when multiple metals of the metal shaping mixture interact upon application of heat, and/or as aluminum diffuses into a surface of the metal build particles. The shaping composition can include a metal shaping mixture of aluminum-containing particulates and secondary metal-containing particulates. In one example, the metal build particles can be copper-containing metal particulates including from 50 wt % to 100 wt % elemental copper, e.g., brass, bronze, etc., or can include iron or an iron alloy, e.g., stainless steel. The shaping composition can, in some examples, include a liquid vehicle, e.g., from about 10 wt % to about 80 wt % liquid vehicle. In further detail, the shaping composition can also include a polymer shaping binder, a polymerizable shaping binder, and/or a reducible-metal compound shaping binder.

Figure 3:
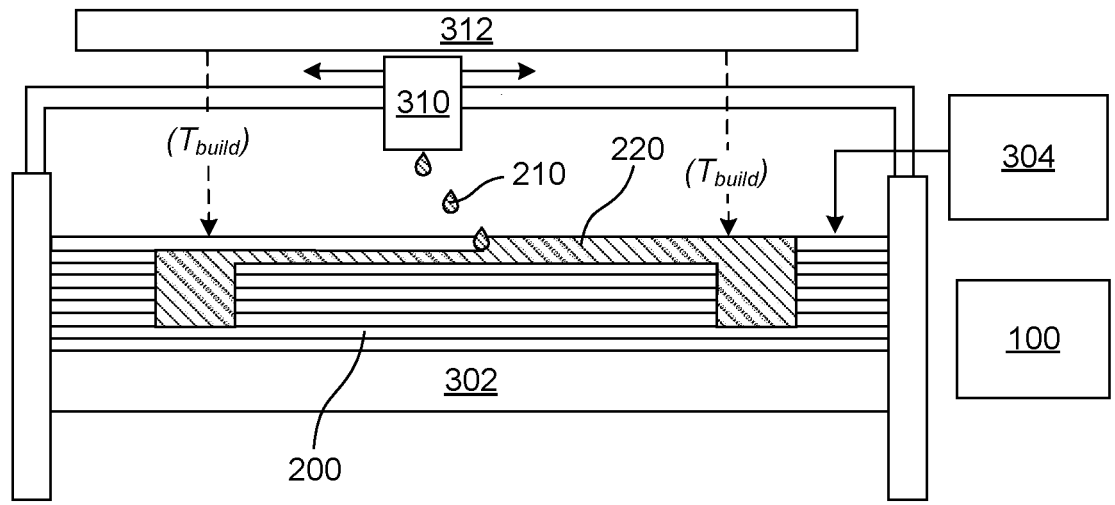
FIG. 3 illustrates an example three-dimensional printing kit associated with an additive manufacturing three-dimensional printer in accordance with the present disclosure.

In FIG. 3, the three-dimensional printing kit is shown with the particulate build material 200 and the binding agent 210 loaded in a 3D printing apparatus 300. In this example the shaping composition 100 is shown next to the 3D printing apparatus in preparation for applying to a green body object 220, once formed and removed from the build platform 302 and from within the particulate build material that is not used to form the green body object. In this example, the particulate build material can be deposited from a build material applicator 304 onto the build platform where it can be flattened or smoothed on a layer by layer basis, such as by a mechanical roller or other flattening technique. A layer of the particulate build material, which typically includes from mostly to all metal build particles, can be deposited and spread out evenly at the top surface. The layer of powder bed material can be from 25 μm to 400 μm, from 75 μm to 400 μm, from about 100 μm to about 400 μm, from about 150 μm to about 350 μm, or from about 200 μm to about 350 μm, for example. The binding agent can be used to generate the green body object on a layer-by-layer basis, for example. Individual layers of particulate build material and previously formed green body object layers are shown, but are not to scale. In this example, the binding agent that may include water and a build binder, such as a reducible-metal compound build binder, e.g., copper nitrate, or a polymeric or polymerizable build binder, e.g., latex particle binder or polyurethane binder, for example, and can be ejected onto the particulate build material from a fluid ejector 310, for example, to provide for selectively pattering the particulate build material. The location of the selective printing of the binding agent can be to a layer corresponding to a layer of a 3D printed object, with information provided to print the respective layer provided by a 3D object model or computer model, for example. A building temperature ($T_{build}$) or heat can be applied for building the green body object in some examples, e.g., from 50° C. to 200° C., but other examples may not use heat when building the green body object. If heat is used, heat can be provided from a heat source 312, at the various layers (or group of layers, or after the green body object is formed) to (i) facilitate the build binder curing process, and/or (ii) remove solvent from the binding agent, which can assist with more rapid solidification of individual layers. Removing solvent from the binding agent can also reduce the wicking period of the binding agent outside of the printed object boundary and allow for a more precise printed green part. In one example, heat can be applied from overhead, e.g., prior to application of the next layer of particulate build material, or after multiple layers are formed, etc., and/or can be provided by the build platform from beneath the particulate build material and/or from the particulate build material source (preheating particulate build material prior to dispensing on the build platform or previously applied 3D object layer). As metal can be very good conductors of heat, when applying heat from below, care can be taken to heat to levels that do not decompose the build binder, in some examples. After individual layers are printed with binding agent, the build platform can be dropped a distance corresponding to a thickness of the applied layer of particulate build material, e.g., about 50 μm to about 200 μm, so that another layer of the particulate build material can be added thereon and printed with the binding agent, etc. The process can be repeated on a layer by layer basis until a green body object is formed that is stable enough to move to an oven suitable for fusing, e.g., sintering, annealing, melting, or the like. In this example, in addition to the green body object formed, there are also green body object supports 222 that are also printed, which are used in this example for example purposes in testing the shaping characteristics of the green body object prepared in accordance with the present disclosure.

Fusing Green Body Objects with Shaping Composition-Induced Surface Support

Green body objects, such as those prepared using three-dimensional printing or other additive manufacturing, can be heat-fused to form fused metal objects. However, after forming the green body object, there is an opportunity for additional shaping to take place prior to heat-fusing the green body object into the fused metal object. As used herein "green body object" (as a complete object mass, plurality of object layers, or even an individual layer) refers to additive components including unfused metal particles and typically a build binder of some type held together in the form of a three-dimensional shape, but which has not yet been heat-fused, e.g., not heat sintered or annealed to fuse the metal particles together. As a green body, the particulate build material can be (weakly) bound together by a binding agent.

Typically, a mechanical strength of the green body is such that the green body can be handled or extracted from a build platform to place in a fusing oven. It is to be understood that any particulate build material that is not patterned with the binding agent is not considered to be part of the green body, even if the particulate build material is adjacent to or surrounds the green body. For example, unprinted particulate build material can act to support the green body while contained therein, but the particulate build material is not part of the green body unless the particulate build material is printed with binding agent, or some other fluid that is used to generate a solidified part prior to fusing, e.g., sintering, annealing, melting, etc. Furthermore, green body objects tend to be somewhat fragile with rigidity lower than the metal part that is to be ultimately formed upon heat-fusing the green body object. Once the green part or green body object is fused, the part or body object can be referred to as a brown object, or more simply herein, as a "fused metal object." The terms "fuse," "fused," "fusing," or the like refers to metal build particles of a green body object that have become heat-joined at high temperatures, e.g., from about 500° C. to about 3500° C., from about 600° C. to about 3000° C., from about 700° C. to about 2500° C., or from about 800° C. to about 2000° C., but more typically from about 600° C. to about 1500° C. to fuse the metal build particles together and to form a fused metal object. In some examples, the temperature can range from about 600° C. to about 1200° C., from about 800° C. to about 1200° C., or from about 750° C. to about 1500° C. Thus, fusing refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

Thus, fusing can include particles becoming melted together as a unitary solid mass, or can include surfaces of metal build particles becoming softened or melted to join together at particle interfaces. In either case, the metal build particles become joined and the fused metal object can be handled and/or used as a rigid part or object without the fragility of the green body object. Sintering of metal build particles is one form of metal particle fusing. Annealing is another form of metal particle fusing. A third type of fusing includes melting metal build particles together to form a unitary mass. The terms "sinter," "sintered," "sintering," or the like refers to the consolidation and physical bonding of the metal build particles together (after temporary binding using the binding agent) by solid state diffusion bonding, partial melting of metal build particles, or a combination of solid state diffusion bonding and partial melting. The term "anneal" refers to a heating and cooling sequence that controls the heating process, and the cooling process, e.g., slowing cooling in some instances, to remove internal stresses and/or toughen the fused metal object (or "brown" part).

If fusing the metal build particles using sintering, the sintering temperature range can vary, depending on the material, but in one example, the sintering temperature can range from about 10° C. below the melting temperature of the metal build particles of the particulate build material to about 60° C. or 80° C. below the melting temperature of the metal build particles of the particulate build material (with time sintering or soaking, material purity, etc., being considered). A non-limiting list of certain metal melting temperatures is provided in Table 1, as follows:

TABLE 1

| Metal or Alloy | Melting Temperature (° C.) |
|---|---|
| Magnesium | 651 |
| Aluminum | 659 |
| Bronze | 913 |
| Brass | 927 |
| Silver | 951 |
| Gold | 1063 |
| Copper | 1083 |
| Cast Iron | 1204 |
| Steel | 1371 |
| Stainless Steel | 1375-1530* |
| Nickel | 1452 |
| Cobalt | 1495 |
| Iron | 1538 |
| Titanium | 1668 |
| Vanadium | 1910 |
| Chromium | 1930 |
| Molybdenum | 2623 |
| Tantalum | 3020 |
| Tungsten | 3422 |

*Range of melting temperatures provided, dependent on grade of stainless steel and other factors.

In further detail, the sintering temperature can also depend upon the particle size, metal purity, exact wt % ratio of metal content for alloys, and/or period of time that heating occurs, e.g., at a high temperature for a sufficient time to cause particle surfaces to become physically merged or composited together). For example, an acceptable sintering temperature range for stainless steel may be from about 1300° C. to about 1520° C., depending on the grade of stainless steel used, considering elemental metal ratios, impurities, particle size, time of heat soak, etc. An example of a sintering temperature range for aluminum may be from about 580° C. to about 650° C., and an example of a sintering temperature range for copper may be from about 1000° C. to about 1070° C. In one example, a sintering temperature can be used during a heat soak period to sinter and/or otherwise fuse the metal build particles to form the fused metal object. Heat soaking time frames for sintering can be from about 5 minutes to about 2 hours, from about 10 minutes to about an hour, or from about 15 minutes to about 45 minutes, for example.

Figure 4:
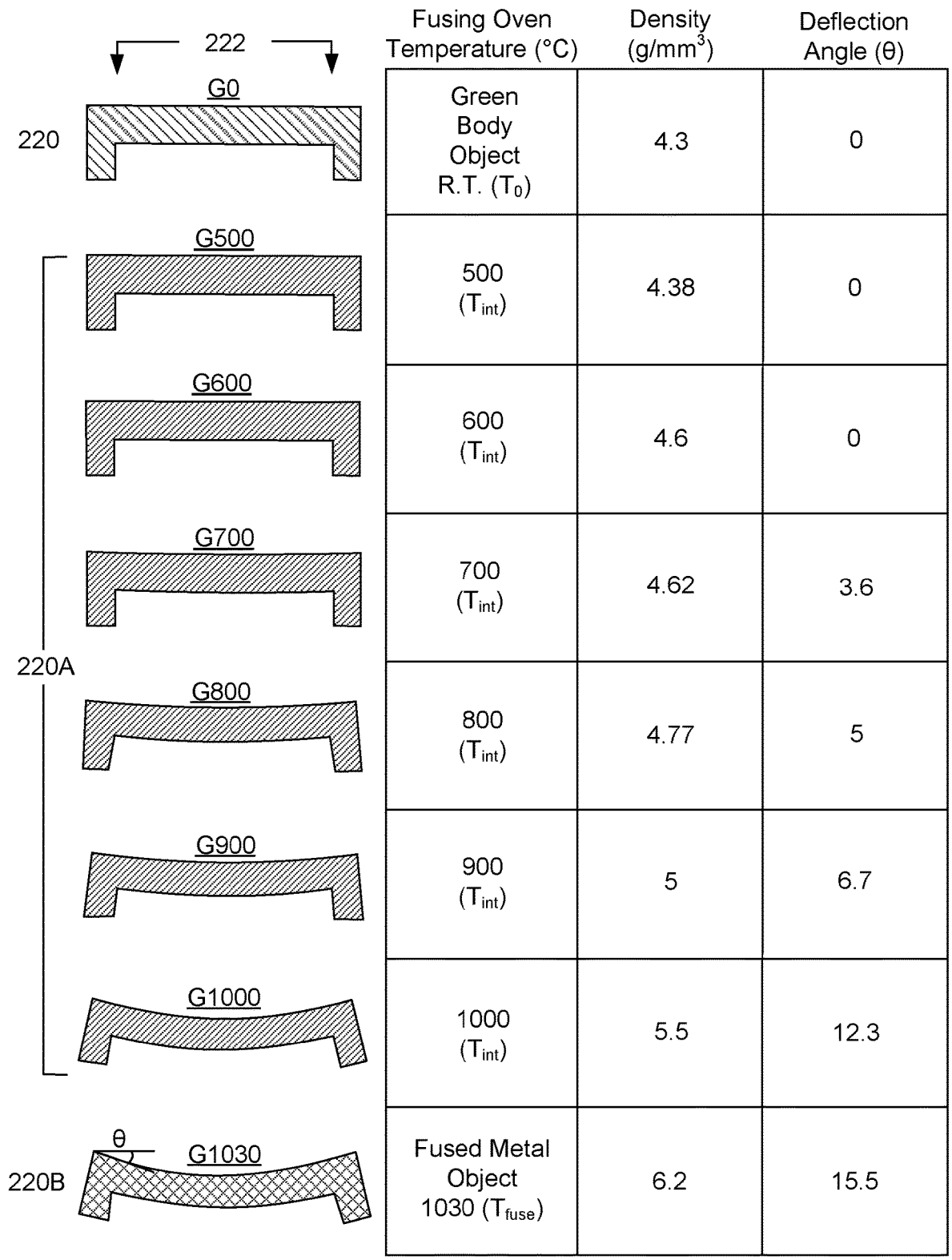
FIG. 4 illustrates example comparative green body objects prepared using 99 wt % pure copper metal build particles and copper nitrate binder relative to the impact of different temperatures within a fusing oven during ramp-up to a fusing temperature in accordance with the present disclosure.

When heating green body objects, the temperature within the fusing oven can be raised from an initial temperature, $T_0$, to an intermediate temperature, $T_{int}$, during heat ramp-up, to a fusing temperature, $T_{fuse}$, where heat-fusing for the metal build particles. While ramping-up the temperature, and even in some cases while at fusing temperatures, green body objects that include cantilevered portions or portions that span multiple supports can sag with temperature increase. To show this effect, FIG. 4 depicts eight green body objects that are three-dimensionally printed using elemental copper with about a 99 wt % purity and having a D50 particle size of about 50 μm. The green body objects included portions that spanned 222 about 28 mm between two supports, and are about 5 mm in thickness along the length of the spanned portion. Five of the samples are heated to an intermediate temperature, $T_{int}$, short of a target fusing temperature, $T_{fuse}$. One green body object is heated to the target fusing temperature, $T_{fuse}$. As copper has a melting temperature of about 1080° C., 1030° C. is a good target temperature for sintering the metal particles together, though it is noted that 1000° C., which is also shown in FIG. 4 as being at an intermediate temperature, $T_{int}$, can be used for sintering as well in some copper examples. The details of this experiment conducted that relates to FIG. 4 is provided in Example 4 hereinafter.

Figure 5:
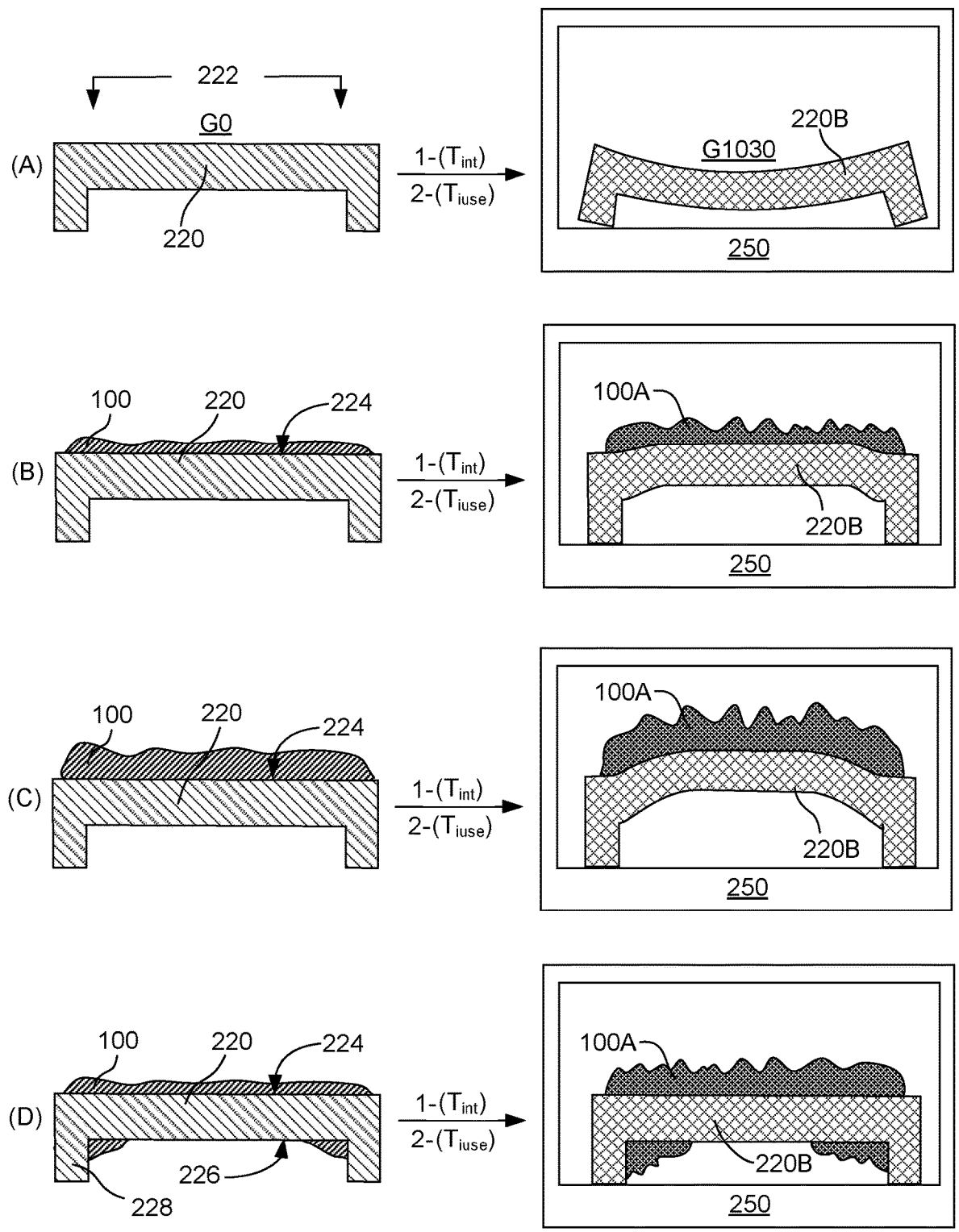
FIG. 5 illustrates example green body objects printed using a three-dimensional printer, with and without shaping composition applied thereto, in accordance with the present disclosure.

Considering this, as shown in FIG. 5, a green body object 220, such as the green body object printed as described with respect to FIG. 4, and as shown by way of four examples, can be placed in a heat-fusing oven 250. In the heat-fusing oven, the green body object can experience a ramp-up of temperature through intermediate temperature, $T_{int}$, up to a fusing temperature, $T_{fuse}$. If the green body object is the copper green body object shown and described in FIG. 4, then the fusing temperature can be within a sintering temperature range for copper as shown in Table 1 by example, or about 1030° C. more specifically set forth in FIG. 4. As shown in FIG. 5, the application of shaping composition 100 generates different results, depending on if, how, how much, what form, what temperatures, etc., are used applied, for example. Without applying any shaping composition in the form of a coating to the green body object, there is gravity-induced deformation or sagging that occurs in this example, particularly along the unsupported span 222 portion (e.g. same as shown in FIG. 4 at about 28 mm long and about 5 mm thick) of the object, as shown at (A). However, by applying a coating of a shaping composition to an upper surface 224 of the green body object, the sagging can be ameliorated or counteracted, as shown at (B)-(D). Ameliorating sagging can, in some instances, introduce deformations beyond the approximate shape of the green body object, as shown at (B) and more particularly at (D) in FIG. 5. The term "approximates" is used as there can be some density increase and a small amount of object shrinking that may occur in some examples when heating fusing a green body object to form a fused metal object, but in many instances, that change is shape, size, density, etc., can be minimal, particularly with respect to size dimensions, can be minimal, e.g., less than about 5% or less than about 10% in size measurements (length, height, depth). In further detail regarding example (D) in particular, it is noted that not only coating thickness, and/or shaping composition formulation can be used to generate the a heat-fused object that approximates the shape of the green body object as formed, but location of application can have a positive impact as well. For example, by applying a smaller amount of shaping composition to a lower surface 226 (and supports or legs 228) of the span, the shape retention properties of the system can be controlled, as shown in this specific example. As a note, after heating, the shaping composition can become an intermetallic reaction product 100A that is no longer a slurry due to evaporation of the liquid during application of heat. Thus, the residual material from the coating can form a soft metallic powder that can be brushed from the surface of the fused metal object, with the liquid having been evaporated therefrom during heating.

Figure 6:
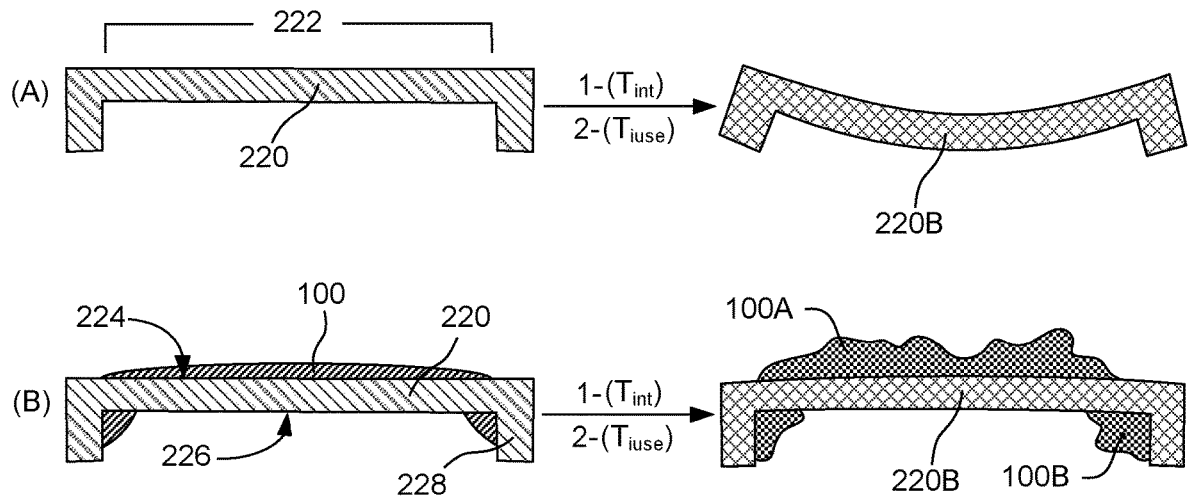
FIG. 6 illustrates example comparative green body objects with longer spans than that shown in FIG. 5, which are printed using a three-dimensional printer, with and without shaping composition applied thereto, in accordance with the present disclosure.

FIG. 6 illustrates another example with a green body object 220 similar to that shown and described in FIGS. 4 and 5, but having a 50 mm span 222. With longer spans, the gravity-induced deformation under heat can be even more pronounced, with the fused metal object 220B becoming heat-fused with a central portion of the span coming into contact with the heat-fusing oven floor during ramp-up to fusing temperatures, as shown at (A). However, by applying a coating of a shaping composition 100 to an upper surface 224 of the green body object, and applying a smaller amount of shaping composition to a lower surface 226 (and supports or legs 228) of the span, the shape retention properties of the system can be controlled, even though the span is almost twice as long as the span shown in FIG. 5. Again, after heating, the shaping composition can become an intermetallic reaction product 100A that is no longer a slurry due to evaporation of the liquid during application of heat.

Figure 7:
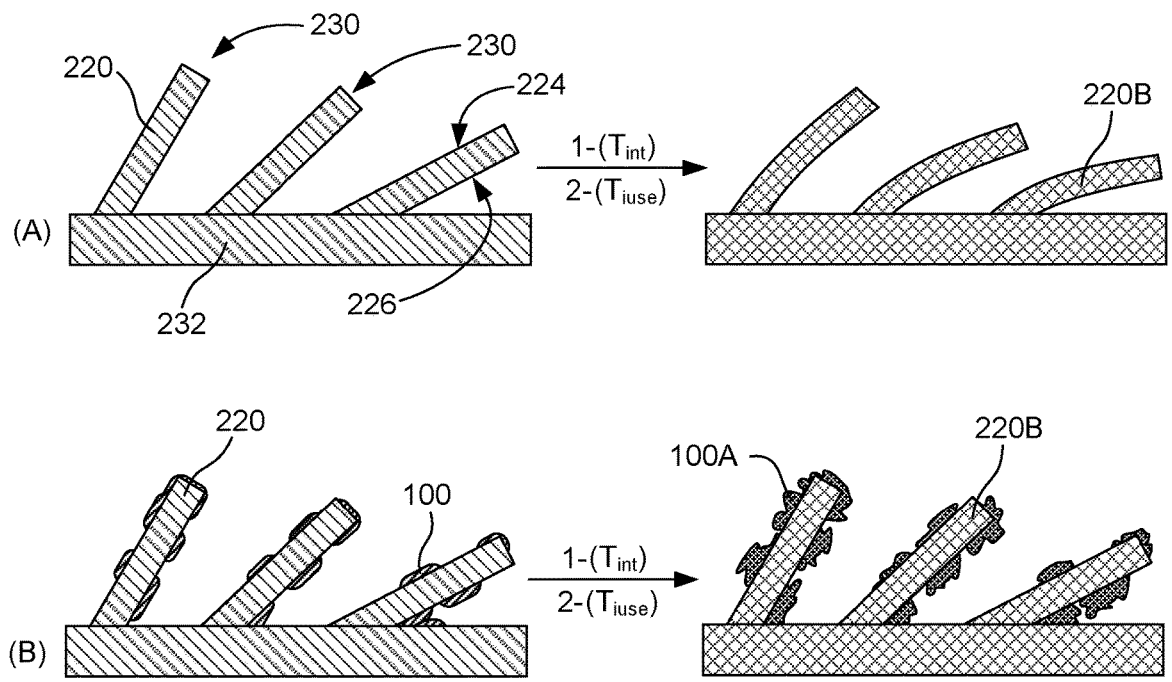
FIG. 7 illustrates example comparative green body objects of a different configuration than in FIG. 5 printed using a three-dimensional printer, with and without shaping composition applied thereto, in accordance with the present disclosure.

FIG. 7 illustrates another example with a green body object 220 of a different configuration, which included multiple cantilevered pillars 230 protruding at different angles from a support base 232 portion. It would be expected that pillars with the greatest angle difference relative to 90° (straight upright) from the base would be more likely susceptible to gravity-induced deformation or sagging during ramp-up to a sintering temperature. This is confirmed at (A) where the pillar to the right experienced more sagging than the pillar in the center, which sagged more than the pillar to the left. However, by applying a coating of a shaping composition 100 to a more relative upper surface 224 and a more relative bottom surface 226 of the angled cantilevered pillars, during heat-fusing the green body object to form a fused metal object, there the coating ameliorated any appreciable sagging for any of the three pillars. Again, after heating, the shaping composition can become an intermetallic reaction product 100A that is no longer a slurry due to evaporation of the liquid during application of heat.

Methods of Shaping and Heat-Fusing Green Body Objects

Figure 8:
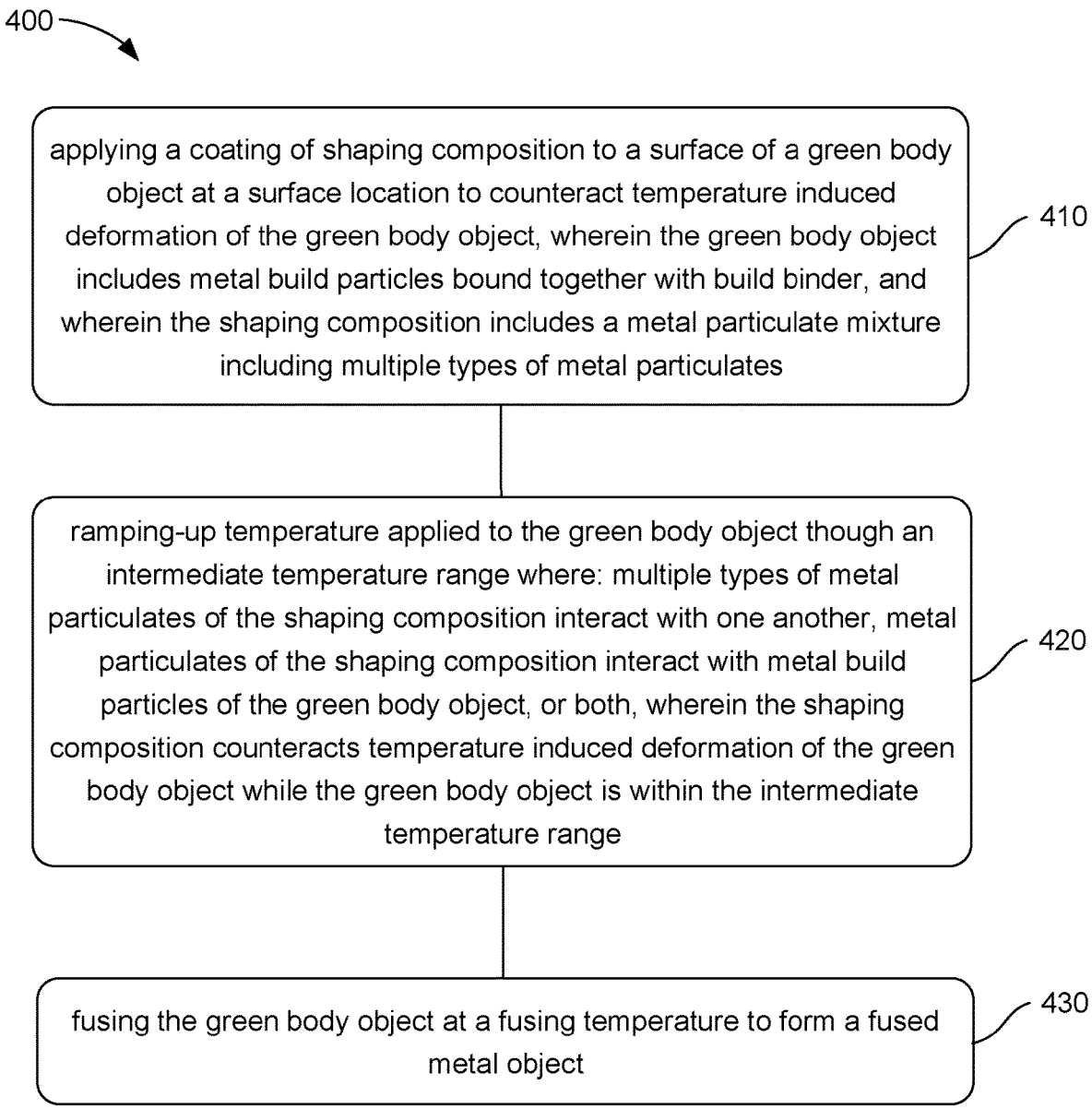
FIG. 8 is a flow diagram of an example controlling green body object deformation in accordance with the present disclosure.

In an example of the present disclosure, and as shown in a flow diagram in FIG. 8, a method 400 of controlling green body object deformation, such as during heat fusing, can include applying 410 a coating of shaping composition to a surface of a green body object at a surface location to counteract temperature induced deformation of the green body object. The green body object can include metal build particles bound together with build binder. The shaping composition can include a metal particulate mixture including multiple types of metal particulates. The method can further include ramping-up 420 temperature applied to the green body object though an intermediate temperature range where (i) multiple types of metal particulates of the shaping composition interact with one another, (ii) metal particulates of the shaping composition interact with metal build particles of the green body object, or (iii) both. The shaping composition can counteract temperature induced deformation of the green body object while the green body object is within the intermediate temperature range. It is noted that green body object deformation can continue and often does continue (often getting more pronounced) while within the fusing temperature range as well, and the shaping compositions can in many instances assist with object support while soaking at a fusing temperature as well. In further detail, the method can also include fusing 430 the green body object at a fusing temperature to form a fused metal object. In one example, forming the green body object can be by three-dimensional printing, including iteratively applying individual build material layers of a particulate build material including the metal build particles, and based on the 3D object model, selectively applying a binding agent to individual build material layers to define individually patterned layers that are built up and bound together to form the green body object.

Binder

There are two compositions described herein that can utilize a binder in accordance with the present disclosure. There can be, for example, a binding agent used for additive three-dimensional printing processes as shown in FIG. 3. The binding agent can include a liquid vehicle and a build binder. There can also be a shaping binder included in the shaping compositions described herein. With the binding agent, the build binder can be carried by a liquid vehicle for jetting from jetting architecture, for example. The build binder can be present in the binding agent at from about 1 wt % to about 30 wt %, for example. With shaping composition, the shaping binder can be co-dispersed with a metal shaping mixture (of aluminum and a secondary metal, or alloys thereof), and may also include a liquid vehicle to form a slurry, for example. The shaping binder can be present in the shaping composition at from about 2 wt % to about 30 wt %, or at the other weight ranges previously described, for example. Thus, the description of the "binder" (or binder compound) herein is relevant to both build binder found in binding agents as well as shaping binder found in shaping compositions. When describing "binder," it is understood to include a description of both types of binder.

Regarding the binder, any of a number of binders can be used, including metal binders or polymeric binders. In other words, the term "binder" or "binder compound" can include any material used to physically bind metal particles together either initially, but often for a period of time during heating in a fusing oven or furnace. With specific reference to metal binder, the metal can be in the form of a reducible-metal compound binder. To illustrate, if stainless steel is used as metal build particles in the particulate build material, or as the secondary metal alloy in the shaping composition, the reducible-metal compound binder may be an iron oxide or salt, a chromium oxide or salt, or a copper oxide, for example. The reducible-metal compound binder can be reduced by hydrogen released from a thermally activated reducing agent in some examples. More general examples of reducible-metal compound binders can include metal oxides (from one or multiple oxidation state), such as a copper oxide, e.g., copper (I) oxide or copper (II) oxide; an iron oxide, e.g., iron (II) oxide or iron (III) oxide; an aluminum oxide, a chromium oxide, e.g., chromium (IV) oxide; titanium oxide, a silver oxide, zinc oxide, etc. As a note, due to variable oxidation states of transition metals, they can form various oxides in different oxidation states, e.g., transition metals can form oxides of different oxidation states. Other examples can include organic or inorganic metal salts. In particular, inorganic metal salts that can be used include metal bromides, metal chlorides, metal nitrates, metal sulfates, metal nitrites, metal carbonates, or a combination thereof. Organic metal salts can include chromic acid, chrome sulfate, cobalt sulfate, potassium gold cyanide, potassium silver cyanide, copper cyanide, copper sulfate, nickel carbonate, nickel chloride, nickel fluoride, nickel nitrate, nickel sulfate, potassium hexahydroxy stannate, sodium hexahydroxy stannate, silver cyanide, silver ethansulfonate, silver nitrate, sodium zincate, stannous chloride (or tin(II) chloride), stannous sulfate (or tin(II) sulfate, zinc chloride, zinc cyanide, tin methansulfonate, for example. In some instances, the reducible-metal compound binder can be in the form of a nanoparticle, and in other instances, the reducible-metal compound binder can be disassociated or dissolved in the aqueous liquid vehicle, e.g., copper nitrate or copper chloride. As particles, the reducible-metal compound binder can have a D50 particle size from about 10 nm to about 10 μm, from about 10 nm to about 5 μm, from about 10 nm to about 1 μm, from about 15 nm to about 750 nm, or from about 20 nm to about 400 nm.

Metal binder can be reducible as a result of introduced atmosphere with a reducing agent, and/or can be thermally activated, for example. Thermally activated reducing agent that can be used may be sensitive to elevated temperatures. Example thermally activated reducing agents can include hydrogen ($H_2$), lithium aluminum hydride, sodium borohydride, a borane (e.g., diborane, catecholborane, etc.) sodium hydrosulfite, hydrazine, a hindered amine, 2-pyrrolidone, ascorbic acid, a reducing sugar (e.g., a monosaccharide), diisobutylaluminium hydride, formic acid, formaldehyde, or mixtures thereof. The choice of reducing agent can be such that it is thermally activated at a temperature, or can be introduced at a temperature where reduction of the metal binder may be desired. By way of example, if considering using a metal oxide nanoparticle as the reducible-metal compound binder, there may be metal oxides that are stable (or relatively unreactive) at room temperature, but upon application of heat, e.g., 200° C. to 1000° C. or 250° C. to 1000° C. or from 300° C. to 700° C., a redox-reaction can result in the production of the pure metal or metal alloy. As an example, mercury oxide or silver oxide can be reduced to their respective elemental metal by heating to about 300° C., but the presence of a reducing agent may allow the reaction to occur at a lower temperature, e.g., about 180° C. to about 200° C. Oxides of more reactive metals like zinc, iron, copper, nickel, tin, or lead may likewise be reduced simply in the presence of a reducing agent, so the reducing agent can be introduced into the fusing oven or furnace at a time where binding properties may be beneficial. Reducing agents, whether thermally activated or reactive without added temperature can be capable of providing hydrogen moieties completing the redox-reaction at elevated temperatures in accordance with examples of the present disclosure. An example of one reaction is shown in Formula 1, as follows:

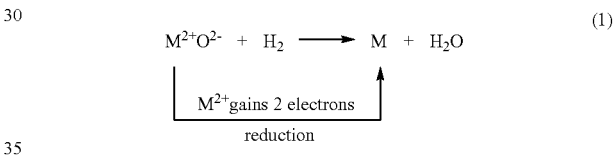

$$M^{2+}O^{2-} + H_2 \longrightarrow M + H_2O \quad (1)$$

$M^{2+}$ gains 2 electrons
reduction

In other examples, the binder or binder compound can be a polymeric binder, such as latex particles, for example. The polymer binder or polymerizable binder can be a polymer that can have different morphologies. In one example, the polymer binder or polymerizable binder can include a uniform composition, e.g. a single monomer mixture, or can include two different compositions, e.g. multiple monomer compositions, copolymer compositions, or a combination thereof, which may be fully separated core-shell polymers, partially occluded mixtures, or intimately comingled as a polymer solution. In another example, the polymer binder or polymerizable binder can be individual spherical particles containing polymer compositions of hydrophilic (hard) component(s) and/or hydrophobic (soft) component(s). For example, a core-shell polymer can include a more hydrophilic shell with a more hydrophic core or a more hydropobic shell with a more hydrophillic core. With respect to "more hydrophiliic" and "more hydrophobic" the term more is a relative term that indicates a hydrophillic or hydrophobic property when considering the core composition and the shell composition in respect to one another.

In some examples, the polymer binder or polymerizable binder can include latex particles. The latex particles can include 2, 3, or 4 or more relatively large polymer particles that can be attached to one another or can surround a smaller polymer core. In a further example, the latex particles can have a single phase morphology that can be partially occluded, can be multiple-lobed, or can include any combination of any of the morphologies disclosed herein. In some examples, the latex particles can be produced by emulsion polymerization. The latex particles in the binding agent can include polymerized monomers of vinyl, vinyl chloride, vinylidene chloride, vinyl ester, functional vinyl monomers, acrylate, acrylic, acrylic acid, hydroxyethyl acrylate, methacrylate, methacrylic acid, styrene, substituted methyl styrenes, ethylene, maleate esters, fumarate esters, itaconate esters, α-methyl styrene, p-methyl styrene, methyl (meth)acrylate, hexyl acrylate, hexyl (meth)acrylate, butyl acrylate, butyl (meth)acrylate, ethyl acrylate, ethyl (meth) acrylate, propyl acrylate, propyl (meth)acrylate, 2-ethylhexyl acrylate, 2-ethylhexyl (meth)acrylate, isodecyl (meth) acrylate, octadecyl acrylate, octadecyl (meth)acrylate, stearyl (meth)acrylate, vinylbenzyl chloride, isobornyl acrylate, isobornyl (meth)acrylate, tetrahydrofurfuryl acrylate, tetrahydrofurfuryl (meth)acrylate, 2-phenoxyethyl (meth) acrylate, benzyl (meth)acrylate, benzyl acrylate, ethoxylated nonyl phenol (meth)acrylate, isobornyl (meth)acrylate, cyclohexyl (meth)acrylate, trimethyl cyclohexyl (meth) acrylate, t-butyl (meth)acrylate, n-octyl (meth)acrylate, lauryl (meth)acrylate, tridecyl (meth)acrylate, alkoxylated tetrahydrofurfuryl acrylate, alkoxylated tetrahydrofurfuryl (meth)acrylate, isodecyl acrylate, isobornyl methacrylate, isobornyl acrylate, dimethyl maleate, dioctyl maleate, acetoacetoxyethyl (meth)acrylate, diacetone acrylamide, diacetone (meth)acrylamide, N-vinyl imidazole, N-vinylcarbazole, N-vinyl-caprolactam, combinations thereof, derivatives thereof, or mixtures thereof. These monomers include low glass transition temperature (Tg) monomers that can be used to form the hydrophobic component of a heteropolymer.

In other examples, the latex particles can include acidic monomers that can be used to form the hydrophilic component of a heteropolymer. Example acidic monomers that can polymerized in forming the latex particles can include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, sodium 1-allyloxy-2-hydroxypropane sulfonate, combinations thereof, derivatives thereof, or mixtures thereof. In some examples, the acidic monomer content can range from about 0.1 wt % to about 15 wt %, from about 0.5 wt % to about 12 wt %, or from about 1 wt % to about 10 wt % of the latex particles with the remainder of the latex particle being composed of non-acidic monomers. In some examples the acid monomer can be concentrated towards an outer surface of a latex particle.

The latex particles can have various molecular weights, sizes, glass transition temperatures, etc. In one example, the polymer in the latex particles can have a weight average molecular weight ranging from about 10,000 Mw to about 500,000 Mw, from about 100,000 Mw to about 500,000 Mw, or from about 150,000 Mw to about 300,000 Mw. The latex particles can have a particle size that can be jetted via thermal ejection or printing, piezoelectric ejection or printing, drop-on-demand ejection or printing, continuous ejection or printing, etc. In an example, the particle size of particles of the polymer binder or polymerizable binder can range from about 10 nm to about 400 nm. In yet other examples, a particle size of polymer binder or polymerizable binder can range from about 10 nm to about 300 nm, from about 50 nm to about 250 nm, from about 100 nm to about 300 nm, or from about 25 nm to about 250 nm. In some examples, the latex particle can have a glass transition temperature that can range from about −20° C. to about 130° C., from about 60° C. to about 105° C., or from about 10° C. to about 110° C.

Liquid Vehicles

Liquid vehicles described herein can refer to the liquid vehicle used for the jettable binding agent of the liquid component of the liquid used in the shaping composition. As an initial matter, the shaping composition can be a liquid vehicle of water. In other examples, there can be other components along with the water, such as organic co-solvent, surfactant, biocide, etc. The liquid vehicle in the shaping composition can be included at from about 10 wt % to about 80 wt %, from about 15 wt % to about 60 wt %, from about 20 wt % to about 50 wt %, or from about 25 wt % to about 50 wt %, for example. Other percentages of the liquid vehicle, such as water or water and other liquid components, can be used, depending on how the shaping composition is to be applied, e.g., dipping, spraying, etc., and may include more liquid vehicle, whereas spreading of a more viscous composition may include less liquid vehicle component. In further detail, many of the components described below with respect to the binding agent can likewise be used in formulating the liquid vehicle of the shaping composition, and those components are incorporated here by reference.

Regarding the jettable binding agent, there can be some care taken with respect to formulating a binding agent that is jettable, particularly if to be thermally jettable. In this example, the binding agent can include a build binder dispersed in an aqueous vehicle, such as a vehicle including water as a major solvent, e.g., the solvent present at the highest concentration compared to other co-solvents. Apart from water, the aqueous vehicle can include organic co-solvent(s), such as high-boiling solvents and/or humectants, e.g., aliphatic alcohols, aromatic alcohols, alkyl diols, glycol ethers, polyglycol ethers, 2-pyrrolidinones, caprolactams, formamides, acetamides, and long chain alcohols. Some other more specific example organic co-solvents that can be included in the binding agent can include aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, substituted formamides, unsubstituted formamides, substituted acetamides, unsubstituted acetamides, and combinations thereof. Some water-soluble high-boiling solvents can act as coalescing aids for latex particles. Examples water-soluble high-boiling solvents can include propyleneglycol ethers, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone and 2-methyl-1,3-propanediol. The organic co-solvent(s) in aggregate can include from 0 wt % to about 50 wt % of the binding agent. In some examples, co-solvents can be present at from about 5 wt % to about 25 wt %, from about 2 wt % to about 20 wt %, or from about 10 wt % to about 30 wt % of the binding agent. In some examples, the binding agent can further include from about 0.1 wt % to about 50 wt % of other liquid vehicle components. These liquid vehicle components can include other organic co-solvents, additives that inhibit growth of harmful microorganisms, viscosity modifiers, pH adjusters, sequestering agents, surfactants, preservatives, etc. Regardless of the formulation, the aqueous vehicle can be present in the binding agent at from about 20 wt % to about 98 wt %, from about 70 wt % to about 98 wt %, from about 50 wt % to about 90 wt %, or from about 25 wt % to about 75 wt.

Some examples liquid vehicle components that can inhibit the growth of harmful microorganisms that can be present can include biocides, fungicides, and other microbial agents, which are routinely used in ink formulations. Commercially available examples can include ACTICIDE® (Thor GmbH), NUOSEPT® (Troy, Corp.), UCARCIDE™ (Dow), VANCIDE® (R.T. Vanderbilt Co.), PROXEL® (Arch Biocides), and combinations thereof.

Particulate Build Material and Metal Build Particles

The particulate build material can include metal build particles of any type that can be fused together at a fusing temperature (above the temperature at which the green body is formed). Fusing can be carried out by sintering, annealing, melting, or the like, metal build particles together within the particulate build material. In one example, the particulate build material can include from about 80 wt % to 100 wt % metal build particles based on a total weight of the particulate build material.

In an example, the metal build particles can be a single phase metallic material composed of one element. In this example, the fusing, e.g., sintering, annealing, etc., can occur at a temperature below the melting point of the element of the single phase metallic material. In other examples, the build material particles can be composed of two or more elements, which can be in the form of a single phase metallic alloy, e.g. the various particles can be alloys, or a multiple phase metallic alloy, e.g. different particles can include different metals, in the form of composites, e.g., core-shell metal particles. In these examples, fusing generally can occur over a range of temperatures. With respect to alloys, materials with a metal alloyed to a non-metal (such as a metal-metalloid alloy) can be used as well. In some examples, the metal build particles can include particles of elemental metals or alloys of copper, titanium, cobalt, chromium, nickel, vanadium, tungsten, tantalum, molybdenum, iron, stainless steel, steel, or an admixture thereof. In one example, the metal build particles can be copper or a copper alloy, for example.

The D50 particle size of the metal build particles can range from about 1 μm to about 150 μm. In some examples, the particles can have a D50 particle size distribution value that can range from about 10 μm to about 100 μm, from about 20 μm to about 150 μm, from about 15 μm to about 90 μm, or from about 50 μm to about 150 μm. Individual particle sizes can be outside of these ranges, as the "D50 particle size" is defined as the particle size at which half of the particles are larger than the D50 particle size and about half of the other particles are smaller than the D50 particle size (by weight based on the metal particle content of the particulate build material).

As used herein, particle size can refer to a value of the diameter of spherical particles or in particles that are not spherical can refer to a longest dimension of that particle. The particle size can be presented as a Gaussian distribution or a Gaussian-like distribution (or normal or normal-like distribution). Gaussian-like distributions are distribution curves that can appear Gaussian in their distribution curve shape, but which can be slightly skewed in one direction or the other (toward the smaller end or toward the larger end of the particle size distribution range). That being stated, an example Gaussian-like distribution of the metal build particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of 25 μm means that 50% of the particles (by number) have a particle size greater than 25 μm and 50% of the particles have a particle size less than 25 μm. Particle size distribution values may not be related to Gaussian distribution curves, but in one example of the present disclosure, the metal build particles can have a Gaussian distribution, or more typically a Gaussian-like distribution with offset peaks at about D50. In practice, true Gaussian distributions are not typically present, as some skewing can be present, but still, the Gaussian-like distribution can be considered to be "Gaussian" as used in practice. The shape of the particles of the particulate build material can be spherical, non-spherical, random shapes, or a combination thereof.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of compositions including multiple components where the different compositions can be separately contained in the same or multiple containers prior to and during use, e.g., building a 3D object, but these components can be combined together during a build and/or shaping process. The containers can be any type of a vessel, box, or receptacle made of any material. Alternatively, a kit may be generated during the process of 3D building a portion at a time. For example, the particulate build material can be decontaminated a layer at a time to form a "kit" of a decontaminated (portion) or a particulate build material that, when combined with the binding agent to be ejected thereon, completes the kit, e.g., a layer of decontaminated build material formed on a build platform or support bed is considered to be a kit when combined with a binding agent loaded in a three-dimensional printing system for ejection thereon.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Green Body Object Sample Preparation

Multiple green body objects of various sizes are prepared using a three-dimensional printing process similar to that shown in FIG. 3. The shapes prepared included supports on two opposite sides with a spanned portion therebetween to evaluate the effect of gravity-induced deformation or sagging during heating, and the ameliorating of sagging during heating using shaping compositions in accordance with the present disclosure. The two types of structures prepared included a 28 mm span, or a 50 mm span. The thickness of the spans are about 5 mm. The green body objects formed are prepared using elemental copper particles having a purity of about 99 wt % and a D50 particle size of about 50 µm. The binding agent used to form the green body object is ejected from a thermal jetting apparatus, and the build binder in the binding agent is a copper nitrate compound. The green body object is cured in a layer-by-layer manner using a temperature, $T_{build}$, of about 120 to 160° C. Once the green body object is printed, the object is heat soaked at an elevated temperature at 70° C. to 100° C. for 60 minutes to 180 minutes.

Example 2—Preparation of Shaping Composition with Polymer Shaping Binder

A shaping composition is prepared that includes about 75 wt % of a metal shaping mixture of stainless steel 316 powder (as the Fe source) and aluminum-silicon alloy (as the aluminum source), about 25 wt % of a latex dispersion that includes a latex shaping binder particle to provide about 5 wt % latex binder particle content, e.g. 20 wt % latex binder particle in the latex dispersion, based on a total weight of the shaping composition. The shaping composition is thus in the form of a thickened slurry. Notably, other levels of shaping binder content and/or metal shaping mixture can be used that may also be sufficient to generate a slurry.

Example 3—Preparation of Shaping Composition with Reducible-Metal Compound Shaping Binder and Reaction Rate Dampening Compound A shaping composition is prepared that includes about 65 wt % of a metal shaping mixture of stainless steel 316 powder (as the Fe source) and aluminum-silicon alloy (as the aluminum source), about 5 wt % copper nitrate shaping binder, about 10 wt % of aluminum oxide ($Al_2O_3$), and about 20 wt % water, based on a total weight of the shaping composition. The metal shaping mixture is prepared to provide about a 1:1 atomic ratio of iron content from the stainless steel to the aluminum content from the aluminum-silicon alloy. The aluminum oxide is not considered in this approximate 1:1 ratio of iron to aluminum, as it acts to control the reaction kinetics rather than participate in the exothermic reaction between the iron and the aluminum. Though the aluminum oxide is added to dampen or control the reaction rate upon application of heat, e.g., slowing the reaction, the slurry can be prepared and used without the aluminum oxide. Likewise, in some examples, the shaping binder can be omitted if the shaping composition can be coated on the green body object and stay in place sufficiently to cause shaping while the temperature is ramping-up through shaping temperatures, $T_{shape}$, up to a fusing temperature, $T_{fuse}$, for the metal build particles that may be used. Furthermore, the shaping composition is in the form of a viscous slurry that is self-supporting when applied and capable of adhering to the green body object surface in any orientation (upward-facing, downward-facing, side-facing, etc.). Notably, other levels of liquid vehicle (or water), shaping binder content metal shaping mixture, and/or aluminum oxide, etc., can be used that may also be sufficient to generate a slurry as well.

Example 4—Impact of Heat on Green Body Object Gravity-Induced Deformation

As shown in FIG. 4, eight green body objects are prepared by three-dimensional printing as describe in Example 1. In this example, the green body objects included 28 mm spans 222. The first sample (G0) green body object 220 as prepared without heating, which was measured for density. There was no angle of deflection because no heating occurred giving the green body object no opportunity to sag due to heat and gravitational forces. In further detail, six of the sample green body objects 220A (G600-G1000) were heated to an intermediate temperature, $T_{int}$, short of a target fusing temperature, $T_{fuse}$, of 1030° C. Upon reaching the various intermediate temperatures for a brief period of heat soaking, e.g., about 60 minutes to about 120 minutes, the fusing oven was cooled back to room temperature and the unfused object was evaluated for the six samples. One green body object, shown at 220B at (G8), was heated to the target fusing temperature, $T_{fuse}$, e.g., 1030° C., and heat soaked for about 30 minutes and then cooled back down to room temperature for evaluation. As copper has a melting temperature of about 1080° C., 1030° C. is a good target fusing temperature for this material for sintering copper metal particles together at locations where they metal particles are in contact with one another. As a note, the samples were placed in a fusing oven and the temperature ramped up through a shaping temperature, $T_{int}$, to a fusing temperature, $T_{fuse}$, but at about 500° C., a reducing gas of $N_2/H_2$ (or $Ar/H_2$ can be used) was introduced to reduce copper compounds that may be present, including compounds initially introduced and/or produced in situ, e.g., copper oxide.

As can be seen as the temperature was increased, the density of the green body objects (up to the fused metal object) increased. G500, G600, and G700 showed no gravity-induced deformation or sagging, with sagging beginning and getting increasingly worse with G800, G900, and G1000. Additionally sagging also occurred at the sintering temperature, shown at G1030, with an angle of deflection ending at about 15.5° for this study. Thus, with 99 wt % pure copper particles having a D50 particle size of about 50 μm, it appears that sagging begins to occur somewhere between 600° C. and 700° C. for this particularly green body object configuration, and with these particular materials. It is noted that there could be even more sagging if a latex build binder were used instead of a reducible-metal compound build binder, as polymeric binder can become ineffective at lower temperatures due to burning off in the fusing oven, e.g., below about 500° C.

Example 5—Fusing Green Body Objects with Shaping Composition-Induced Surface Support To compare the results shown at G0 and at G1030 in Example 4 (FIG. 4) to results achievable using a shaping composition 100 prepared according to Example 3 as a coating, a green body object 220 was prepared identically as that shown at G0. G0 and G1030 (shown in a fusing oven 250) are reproduced and shown at (A) in FIG. 5. The green body object coated with the shaping composition in this experiment is shown at (D) at coating thickness about one-quarter as thick as the green body object, but can be thicker or thinner in other examples. Once the shaping composition was applied, it was baked at from 70° C. to 100° C. to dry the shaping composition coating prior to shaping and fusing in a furnace or fusing oven. By applying a coating of the shaping composition to an upper surface 224, a lower surface 226 at ends of the 28 mm span 222, and on the supports or legs 228 of the green body object, the shape retention properties of the shaping composition under a ramp-up heating profile controlled deflection or deformation of the span portion of the green body object, forming a fused metal object that approximates the shape of the green body object GO. As also shown at (D), after heating, the shaping composition became a Fe—Al intermetallic reaction product 100A in the form of a soft metallic powder that was easily brushed from the surface of the fused metal object.

The heating profile used in this example can be any heating profile that generates fusing temperatures while ramping the temperature up through the intermediate temperature at an appropriate level to cause desired shaping. Other factors such as reaction speed can be considered, and materials and/or heating profiles can be used to design a shaping and fusing system appropriate for the specific green body object that is to be shaped and fused. In this example, and other examples herein, a tubular furnace was used with parts placed on a flat alumina crucible or quartz plate during sintering. One of two heating protocols was selected for use, but either profile would generate similar results for the green body objects evaluated herein. As a note, "Heating Profile 1" (below) provides a slower and gentler ramp-up of temperature and in some instances can reduce sag deformation that may occur due to application of heat and gravity forces, for example. However, "Heating Protocol 2" (below) can be suitable in many instances as well. Two example heating profiles are provided, as follows:

Heating Protocol 1—Heating at 5° C./minute from room temperature to 170° C.→Heating at 2.5° C./minute from 170° C. to 300° C.→heat soak at 300° C. for 1 hours→Heating at 2.5° C./minute from 300° C. to 500° C.→heat soak at 500° C. for 2 hours→Heat at 2.5° C./minute from 500° C. to 650° C.→heat soak at 650° C. for 1 hour→Heat at 2.5° C./minute to 1000° C.→heat soak at 1000° C. for 30 minutes→Cool in furnace to room temperature.

Heating Protocol 2—Heating at 5° C./minute from room temperature to 500° C.→heat soak at 500° C. for 2 hours→Heat at 5° C./minute from 500° C. to 650° C.→heat soak at 650° C. for 1 hour→Heat at 5° C./minute to 1000° C.→heat soak at 1000° C. for 30 minutes→Cool in furnace to room temperature.

The term "heat soak" above refers to hold times where shaping and/or fusing may be occurring while the fusing oven (furnace) is holding at a constant elevated temperature.

In this example, the exothermic mixture was designed to generate an exothermic reactive shaping composition to achieve $FeAl+FeAl_2$ during shaping and fusing; however, other intermetallic products between Fe and Al can form as well. One advantage of using an iron and aluminum system for the metal shaping mixture within the shaping composition is that their reaction with one another can start to occur at low temperatures, e.g., 300° C., and are strongly exothermic in nature. Thus, the evolved heat can further sustain reaction propagation. Furthermore, the reaction between iron and aluminum can progress in ambient air (albeit heated within the fusing oven), in an inert gas, at ambient pressures, or in a vacuum. Therefore, fusing oven atmosphere is not particularly relevant to the exothermic reaction. In this example, however, it is noted that the reducing gas was introduced not for contributing to the exothermic reaction of the metal shaping mixture, but rather for the reducible-metal compound binder that is used, whether it be from the shaping binder from the shaping compound and/or the build binder of the green body object.

Example 6—Fusing Green Body Objects with Shaping Composition-induced Surface Support The same experiment was conducted as described in Example 5 in this example using the green body object 220 structures shown in FIG. 6. Thus, Example 5 was repeated, except that the green body object had an unsupported span 222 of 50 mm rather than 28 mm, shown at (A) and (B). With object (A), the fused metal object 220B became heat-fused with a central portion of the span coming into contact with the heat-fusing oven floor during ramp-up and at the fusing temperature, $T_{fuse}$, as shown at (A). However, by applying a coating of a shaping composition 100 to an upper surface 224 of the green body object, and a smaller amount of shaping composition to a lower surface 226 (and supports or legs 228) of the span, the shape retention properties of the system (green body object and shaping composition) can be controlled, even though the span is almost twice as long as the span evaluated in Example 5. After heating, the shaping composition became a Fe—Al intermetallic reaction product 100A that is no longer a viscous slurry, and could be easily brushed from the surface of the fused metal object.

Example 7—Fusing Green Body Objects with Shaping Composition-Induced Surface Support The same experiment was conducted as described in Example 5 in the present example using the green body object 220 structures shown in FIG. 7. FIG. 7 illustrates a structure with multiple cantilevered pillars 230 protruding at different angles from a support base 232 portion. It would be expected that pillars with the greatest angle difference relative to 90° (straight upright) from the base would be more likely susceptible to gravity-induced deformation or sagging during ramp-up to a sintering temperature. This is confirmed at (A) where the pillar to the right experienced more sagging than the pillar in the center, which sagged more than the pillar to the left. However, by applying a coating of a shaping composition 100 to a more relative upper surface 224 and a more relative bottom surface 226 of the angled cantilevered pillars, during heat-fusing the green body object to form a fused metal object, there the coating ameliorated any appreciable sagging for any of the three pillars. Again, after heating, the shaping composition became a Fe-AL intermetallic reaction product 100A that is was no longer a viscous slurry due to evaporation of the liquid during application of heat. It could be brush away from the surface easily.

Example 8—Surface Treatment after Fused Metal Object Formation

A fused metal object prepared using a shaping composition to generate a shaping composition-induced surface support was cleaned up by brushing intermetallic reaction product therefrom, and then lightly sandblasting the surface of the object to form a smooth surface.

While the present technology has been described with reference to certain examples, various modifications, changes, omissions, and substitutions can be made without departing from the disclosure.

What is claimed is:

1. A three-dimensional printing kit, comprising:
 a particulate build material comprising from about 80 wt % to 100 wt % metal build particles having a D50 particle size distribution value ranging from about 50 µm to about 150 µm;
 a binding agent contained separately from the particulate build material and including a build binder to apply to particulate build material layers to form a green body object; and
 a shaping composition to apply to a surface of the green body object to ameliorate deformation within an intermediate temperature range where the build binder is not effective at retaining the green body object shape prior to the metal build particles becoming heat-fused, the shaping composition including:
  a water-based liquid vehicle present at from 20 wt % to about 30 wt %, based on a total weight of the shape composition;
  from about 65 wt % to about 75 wt %, based on the total weight of the shaping composition, of a metal particulate mixture including aluminum-containing particulates and iron-containing particulates independently having a D50 particle size ranging from about 5 µm to about 100 µm; and
  from about 5 wt % to about 15 wt % of a shaping binder;
  wherein a viscosity of the shaping composition ranges from about 50 cps to about 5000 cps.

2. The three-dimensional printing kit of claim 1, wherein an atomic ratio of aluminum-to-iron present in the metal particulate mixture ranges from about 10:1 to about 1:2.

3. The three-dimensional printing kit of claim 1, wherein the metal build particles are copper-containing metal particles including from 50 wt % to 100 wt % of elemental copper.

4. The three-dimensional printing kit of claim 1, wherein the shaping binder is a reducible-metal compound shaping binder.

5. The three-dimensional printing kit of claim 1, wherein the build binder is latex particles having a weight average molecular weight ranging from about 10,000 Mw to about 500,000 Mw.

6. The three-dimensional printing kit of claim 1, wherein the aluminum-containing particulates and secondary metal-containing particulates independently have a D50 particle size ranging from about 50 µm to about 100 µm.

7. The three-dimensional printing kit of claim 1, wherein the shaping composition consists of:
 about 75 wt % of the metal particulate mixture;
 about 5 wt % of the shaping binder; and
 about 20 wt % of the water-based liquid vehicle, wherein the water-based liquid vehicle consists of water, an organic co-solvent, and a combination thereof.

8. The three-dimensional printing kit of claim 1, wherein:
 the metal build particles are copper; and
 the build binder is copper nitrate or copper chloride.

9. The three-dimensional printing kit of claim 1, wherein the shaping composition consists of:
 about 65 wt % of the metal particulate mixture;
 the shaping binder consisting of about 5 wt % copper nitrate and about 10 wt % aluminum oxide; and
 about 20 wt % of the water-based liquid vehicle.

10. A method of controlling green body object deformation comprising:
 forming the green body object by:
  iteratively applying individual build material layers of a particulate build material comprising from about 80 wt % to 100 wt % metal build particles having a D50 particle size distribution value ranging from about 50 µm to about 150 µm; and
  based on a 3D object model, selectively applying a binding agent, including a build binder, to individual build material layers to define individually patterned layers that are built up and bound together with the build binder to form the green body object, the binding agent being contained separately from the particulate build material;
 applying a coating of a shaping composition to a surface of the green body object at a surface location to ameliorate deformation within an intermediate temperature range where the build binder is not effective at retaining the green body object shape prior to the metal build particles becoming heat-fused, wherein the shaping composition includes:
  a water-based liquid vehicle present at from 20 wt % to about 30 wt % based on a total weight of the shape composition;
  from about 65 wt % to about 75 wt %, based on the total weight of the shaping composition, of a metal particulate mixture including aluminum-containing particulates and secondary metal-containing particulates independently having a D50 particle size ranging from about 5 µm to about 100 µm, wherein the secondary metal-containing particulates are iron-containing particulates; and
  from about 5 wt % to about 15 wt % of a shaping binder;
  wherein a viscosity of the shaping composition ranges from about 50 cps to about 5000 cps;
 ramping-up temperature applied to the green body object though an intermediate temperature range where: multiple types of metal particulates of the shaping composition interact with one another, metal particulates of the shaping composition interact with metal build particles of the green body object, or both, wherein the shaping composition counteracts temperature induced deformation of the green body object while the green body object is within the intermediate temperature range; and fusing the green body object at a fusing temperature to form a fused metal object.

\* \* \* \* \*